E. H. WAUGH.
PNEUMATIC SCRAPER FOR CLEANING FISH.
APPLICATION FILED DEC. 8, 1917.

1,309,923.

Patented July 15, 1919.
3 SHEETS—SHEET 1.

Inventor
Edward H. Waugh
By Henry L. Reynolds,
Attorney

E. H. WAUGH.
PNEUMATIC SCRAPER FOR CLEANING FISH.
APPLICATION FILED DEC. 8, 1917.

1,309,923.

Patented July 15, 1919.
3 SHEETS—SHEET 3.

Inventor
Edward H. Waugh
By Henry L. Reynolds.
Attorney

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

PNEUMATIC SCRAPER FOR CLEANING FISH.

1,309,923.   Specification of Letters Patent.   Patented July 15, 1919.

Application filed December 8, 1917. Serial No. 206,274.

*To all whom it may concern:*

Be it known that I, EDWARD H. WAUGH, a citizen of the United States, and resident of the city of Seattle, county of King, and State of Washington, have invented certain new and useful Improvements in Pneumatic Scrapers for Cleaning Fish, of which the following is a specification.

My invention relates to apparatus used for the cleaning of fish and consists of a fish cleaning device which employs an air suction to better hold the fish up to the scraper and also to carry away the particles which are loosened by the scraper. The device is thus a pneumatic or suction scraper.

The object of my invention is to provide a means for thoroughly cleaning fish which will act effectively upon the fish without injuring them and which will thoroughly remove all the undesired parts thereof.

Another object of my invention is to provide an effective cleaning device which is simple in its construction and which may be effectively operated, and be reliable in its action.

In the accompanying drawings I have shown my device in the form of construction which is now most preferred by me. I am, however, aware that the principles embodied in this invention may be applied to types of construction of scraping members which are very different in appearance from that herein shown, and yet which will fall fully within the scope of my present invention.

I have shown my invention as applied to a machine of the type which is represented by the patent to Smith, No. 1,034,525 of August 6, 1912. This machine is provided with apparatus which removes the head of the fish, then consecutively removes the tail and fins, slits the fish lengthwise through the belly, and removes the entrails. These devices just enumerated, act consecutively, each to perform its function, but it has been found necessary to supplement the action of these parts, either by other apparatus which will more thoroughly do the nicer parts of the cleaning of the fish to remove the final objectionable particles, or to have the same done by hand after the fish have passed through the machine.

The cleaning or scraping devices which are the subject of this invention are applied to the machine at a point where they act upon the fish after the attachments, which are shown in said patent and are above referred to, act upon the fish.

I have discovered that the interior cavity of the fish which has been opened up by the slitting saw and which has been, in the main at least, cleared of the entrails by the devices shown in said patent, or by equivalent devices, will still contain many small particles of the skin which forms the inner lining of the abdominal cavity and also portions of the blood which clots in the blood sac along the back bone of the fish. In consequence, it has heretofore been necessary to supplement the action of said former machine by a crew of eight to ten "slimers," who inspect and finish cleaning the fish.

The type of scraper which I have found to be most effective in removing these particles and doing the finishing steps of the cleaning operation, consists of a pneumatic or suction device which is provided with a scraping edge, or edges, to engage the surface of the fish, and in addition to which an air exhausting device so connected that the fish is drawn and held in close contact with the scraper and the particles which may be loosened by the scraper, are promptly removed and deposited elsewhere.

My invention thus comprises a scraper having a face which engages the fish to loosen the particles which it is desired to remove and pneumatic means for holding the fish in gentle and uniform contact with the scraper and for removing said particles when loosened by the scraper.

Figure 3:
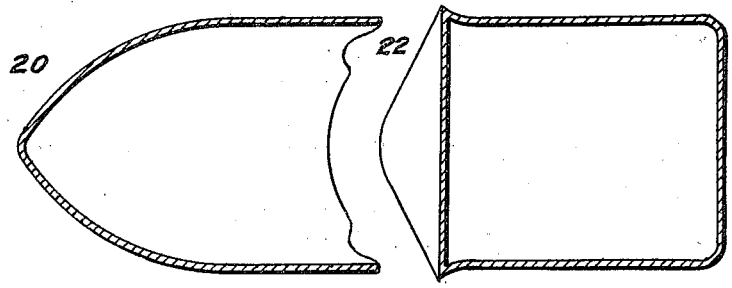
Fig. 3 is a longitudinal section through one of the scraping elements, located substantially on the line 3—3 of Fig. 4.
Figure 4:
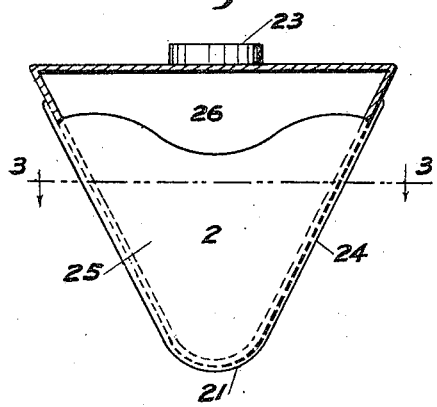
Fig. 4 is a transverse section taken through the gap in the side walls of the scraper.

The type of scraper which I have adopted and now prefer to employ is shown separately in Figs. 3 and 4. As therein shown, it consists of an elongated body which is approximately of a triangular cross section, having the edge which extends to the bottom of the abdominal cavity of the fish rounded to conform as closely as may be with the abdominal cavity after the fish has been slit.

This scraper 2 is provided with an end 20 which is rounded so as to make a dull point which facilitates its entering between the flanks of the fish. The scraper is provided with a slot which extends across the same from the point 21 of the cross sectional shape backward approximately to the base of the triangle. This slot 22 is of sufficient width to permit ready entrance of whatever particles may be removed from the fish. At the back or base of the triangle a suction connection is made at 23. This is preferably by means of a pipe 3 which is of flexible character so that the scraper 2 may be free to move within certain limitations.

I have also shown the scraper body as being secured to a rod 4 which is mounted to slide in suitable guides, as 5, and have provided a spring, as 40, by which the scraper is evenly held toward the fish as the same pass by the scraper.

Figure 1:
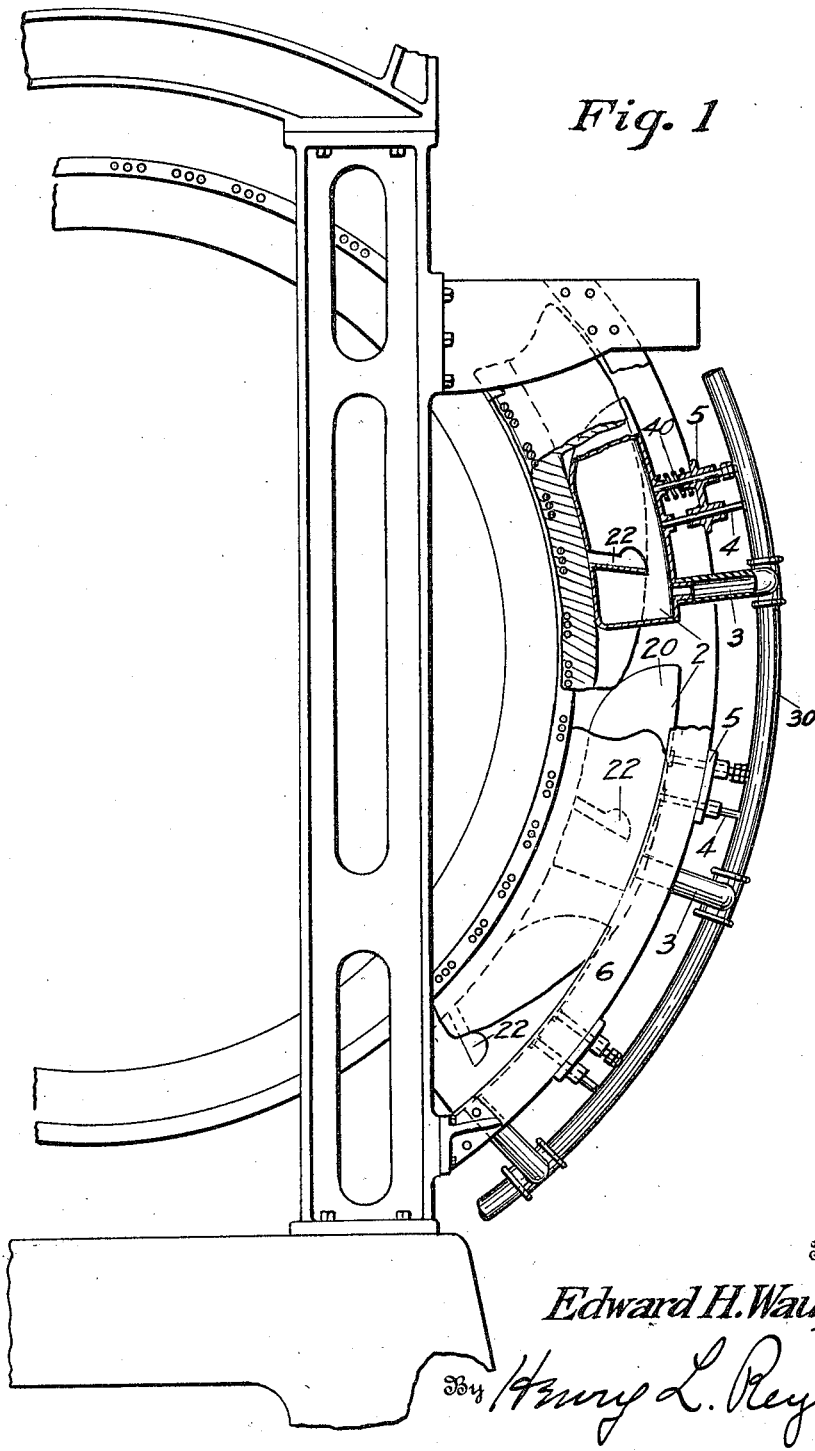
Figure 1 is a side view of a portion of a fish cleaning machine of a standard type given to show the manner of applying my present invention thereto and its location thereon.
Figure 2:
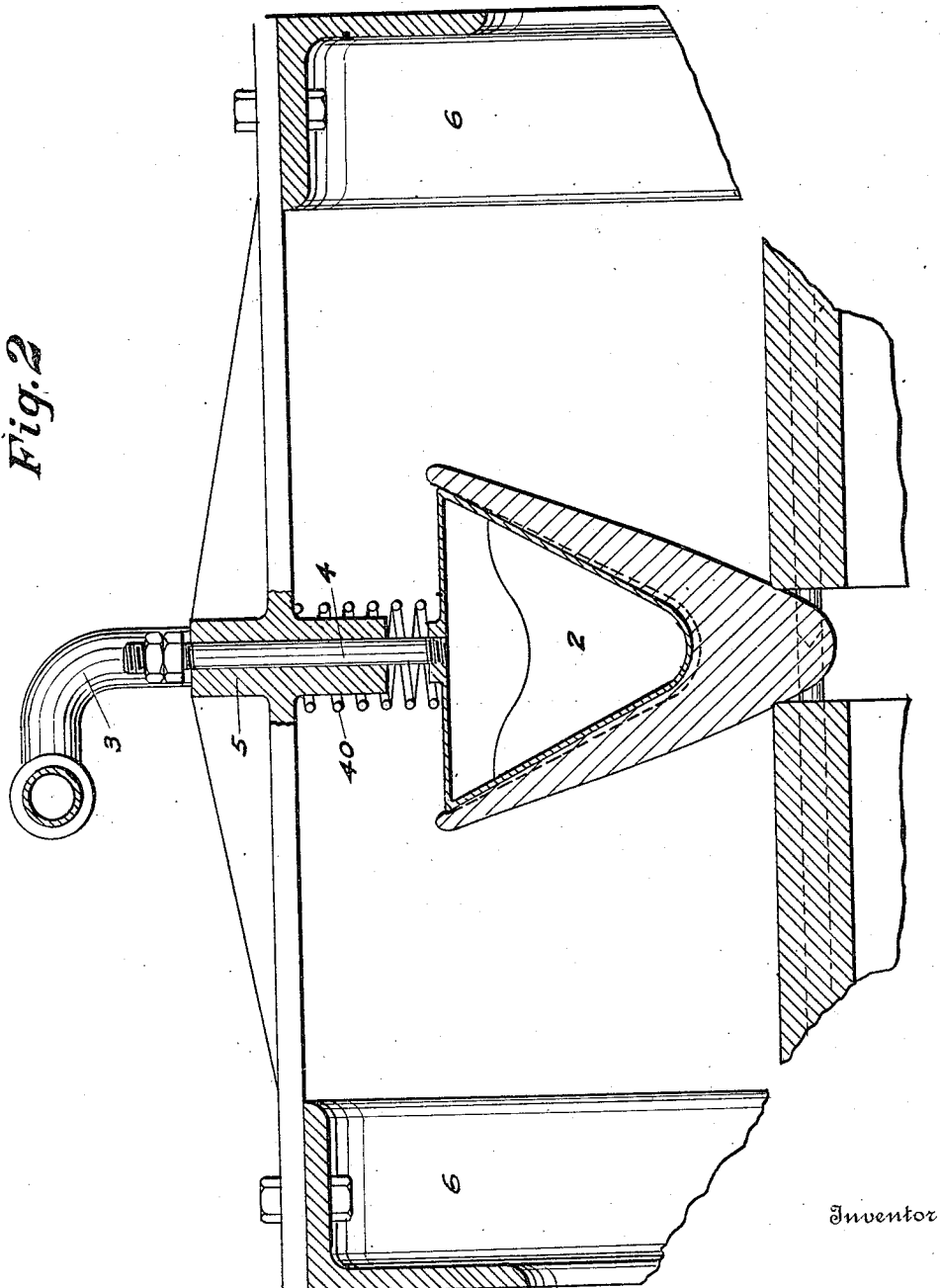
Fig. 2 is a transverse section through one of my present scrapers showing a fish being acted upon and the manner of mounting the device upon the frame work of the machine.

The character of the slot 22 is clearly shown by the side view shown in Fig. 1. The edges 24, being the ones against which the fish in its movement engage, are preferably projected slightly beyond the surface of this side of the scraper body. This projection is clearly shown in Fig. 4, and need not be very great. The air being exhausted from the body of the scrapers, the fish is sucked in close contact with the scraper in passing, so that the scraper acts with certainty upon the side of the fish. The force of this holding action may be regulated somewhat by the character of the suction. Also, this suction is valuable by reason of the fact that the particles removed by the scraper are immediately sucked therein and discharged through the pipes 3 and 30 which connect all the scrapers to any suitable point where the particles removed are deposited.

I prefer to employ a diaphragm 25 which extends across the body of the scraper at or just below the scraping edge 24, excepting that an opening 26 is left at the back side of the scraper.

In installing this device upon the machine referred to, I place a number of individual scrapers, the number corresponding with conditions, so that they engage the fish in passing. Each fish is, therefore, passed over a number of these scrapers with the final result that every particle adhering to the inner walls of the abdominal cavity, which is readily removable, is removed and carried away. I have found by practical operation that the pneumatic scraper is the most effective means for the finishing and thorough cleaning of this abdominal cavity. Its action is more gentle upon the fish than scrapers which secure pressure by purely mechanical means, and there is much less liability of tearing a fish which is soft.

One of the benefits of the pneumatic scraper is that it insures the right kind of contact of the fish with the scraping edge thereof and also that it thoroughly and effectively removes the particles loosened from the fish. Without the action of the air in this way particles might be loosened by the scraper and yet not removed.

I have found the pneumatic scrapers to act to more thoroughly clean a fish than any other type which I have seen tried. I do not, therefore, wish to have my present invention limited to a pneumatic scraper of the particular type herein shown, but wish to broadly cover the application of air suction to a scraper of this kind.

What I claim as my invention is:

1. A fish cleaning device comprising a scraper, means for yieldingly holding it toward the fish and means for pneumatically holding the fish against the scraper.

2. A fish cleaning device comprising a hollow body having a transverse section adapted to fit into and slide along the abdominal cavity of a fish after it has been slit and having a transverse slot in the fish entering parts thereof and means for exhausting the air from said body.

3. A fish cleaning device comprising a hollow body having a transverse section adapted to fit into and slide along the abdominal cavity of a fish after it has been slit and having a transverse slot in the fish entering parts thereof and a scraping edge extending about the edge of said slot.

4. A fish cleaning device comprising a hollow body having a transverse section adapted to fit into a slitted fish and having holes in the body entering parts thereof, means for exhausting the air therefrom and means for passing a slitted fish over said body.

5. A fish cleaning device comprising a hollow body adapted to fit into a slitted fish and means for producing a relative movement between the fish and said body lengthwise of the fish, said body having holes in the fish entering part thereof provided with scraping edges, and means for exhausting the air from said body.

6. A fish cleaning scraper comprising a hollow body having sides adapted to fit within a slitted fish to closely engage the walls of its visceral cavity, suction openings in said sides having scraping edges, and means for applying a suction draft to the cavity of said scraper.

7. A fish cleaning scraper comprising an elongated hollow body having side walls meeting in a rounded apex and a tapered end adapted to facilitate entering the slitted visceral cavity of a fish, said side walls having a suction opening therein and means for applying a suction to the hollow of said scraper.

8. A fish cleaning scraper comprising an elongated hollow body having side walls meeting in a rounded apex, and having a suction opening extending across said sides and about the apex, one edge of said opening being adapted to act as a scraper, and a suction draft connection with the hollow of said scraper.

9. A fish cleaning scraper comprising a hollow body adapted to fit the visceral cavity of a slitted fish and having a suction slot extending across the surfaces which engage the inner walls of said cavity, a diaphragm extending from one edge of said slot transversely of said body but leaving an opening communicating with the space back of the diaphragm from said slot, and means for applying suction to the said space back of the diaphragm.

10. A fish cleaning device comprising a hollow scraper adapted to fit within a slitted fish and having suction openings adapted to be covered by the fish in passing and scraping edges along the margin of the suction openings, means for automatically passing the fish over the scraper, and means for applying suction to said scraper to provide a close and yielding engagement with the fish and to convey away the material removed by said scraper.

Signed at Seattle, Washington, this 27th day of November, 1917.

EDWARD H. WAUGH.

Copies of this patent may be obtained for five cents each, by addressing the "Commissioner of Patents, Washington, D. C."